United States Patent
Nakajima et al.

Patent Number: 5,487,083
Date of Patent: Jan. 23, 1996

[54] HAND-OFF METHOD AND MOBILE STATION FOR SPREAD SPECTRUM MOBILE COMMUNICATION

[75] Inventors: Nobuo Nakajima; Kenji Imamura, both of Yokohama, Japan

[73] Assignee: NTT Mobile Communications Network Inc., Tokyo, Japan

[21] Appl. No.: 235,789

[22] Filed: Apr. 29, 1994

[30] Foreign Application Priority Data

May 12, 1993 [JP] Japan .................................. 5-110544
May 12, 1993 [JP] Japan .................................. 5-110545

[51] Int. Cl.⁶ ........................................ H04K 1/10
[52] U.S. Cl. ................................ 375/200; 455/33.1
[58] Field of Search ...................... 375/1; 455/33, 455/34

[56] References Cited

U.S. PATENT DOCUMENTS

| | | | |
|---|---|---|---|
| 5,101,501 | 3/1992 | Gilhousen et al. | 375/1 |
| 5,179,571 | 1/1993 | Schilling | 375/1 |
| 5,265,119 | 11/1993 | Gilhousen et al. | 375/1 |
| 5,267,261 | 11/1993 | Blakeney et al. | 375/1 |

FOREIGN PATENT DOCUMENTS

| | | |
|---|---|---|
| 9107020 | 5/1991 | WIPO . |
| 9215164 | 9/1992 | WIPO . |

*Primary Examiner*—David C. Cain
*Attorney, Agent, or Firm*—Pollock, Vande Sande, & Priddy

[57] ABSTRACT

Radio zones 2a through 2d are each assigned radio frequency channels of the number corresponding to the zone traffic, one frequency f1 of the radio frequency channel is assigned in common to all radio zones, and radio channels of the same frequency are assigned spectrum spreading codes different for each zone. A mobile station is provided with two correlators 14 and 15. If the received signal level lowers when the mobile station stays in the radio zone 2a and is in conversation over the channel of a frequency f2, the mobile station once switches the communication to a channel of the common frequency f1 and continues the communication using one of the correlators, while at the same time the mobile station scans spectrum spreading codes for control channels of the respective radio zones by the other correlator for measuring the received signal levels of the control channels and determines a destination radio zone which provides the maximum received signal level.

8 Claims, 7 Drawing Sheets

FIG. 4

| | FREQ | CHANNELS | FOR TRAFFIC | FOR CONTROL | FOR ZONE SELECTION |
|---|---|---|---|---|---|
| 2a | f1 | $C1_1$ : | $C1_{11}$ ~ $C1_{1m}$ | $C1_{1C}$ | $C1_{1A}$ |
| | f2 | $C1_2$ : | $C1_{21}$ ~ $C1_{2m}$ | × | $C1_{2A}$ |
| 2b | f1 | $C2_1$ : | $C2_{11}$ ~ $C2_{1m}$ | $C2_{1C}$ | $C2_{1A}$ |
| | f2 | $C2_2$ : | $C2_{21}$ ~ $C2_{2m}$ | × | $C2_{2A}$ |
| | f3 | $C2_3$ : | $C2_{31}$ ~ $C2_{3m}$ | × | $C2_{3A}$ |
| 2c | f1 | $C3_1$ : | $C3_{11}$ ~ $C3_{1m}$ | $C3_{1C}$ | $C3_{1A}$ |
| | f2 | $C3_2$ : | $C3_{21}$ ~ $C3_{2m}$ | × | $C3_{2A}$ |
| 2d | f1 | $C1_1$ : | $C1_{11}$ ~ $C1_{1m}$ | $C1_{1C}$ | $C1_{1A}$ |

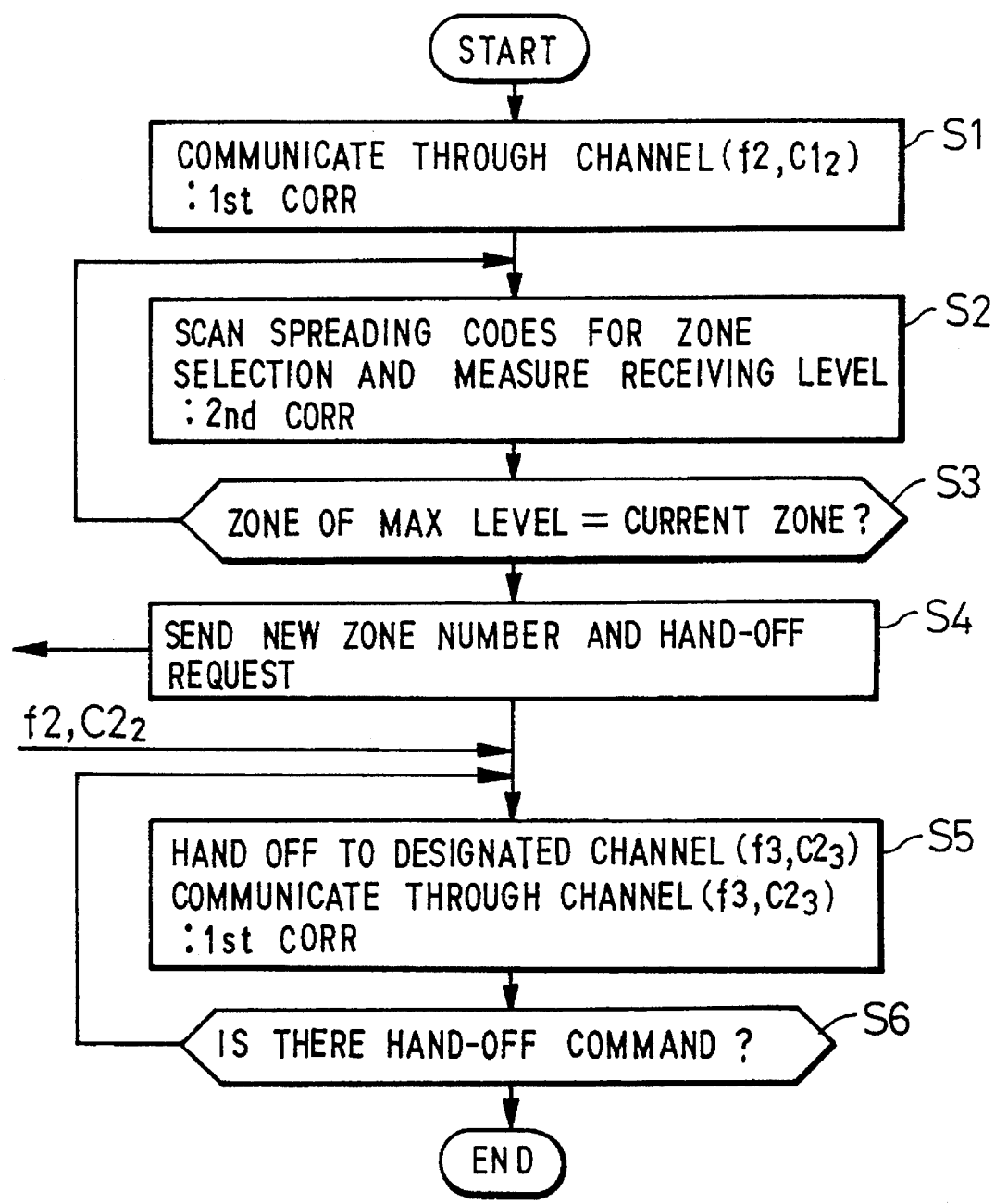

HAND-OFF METHOD AND MOBILE STATION FOR SPREAD SPECTRUM MOBILE COMMUNICATION

BACKGROUND OF THE INVENTION

The present invention relates to a hand-off method and a mobile station for a spread spectrum cellular mobile communication system.

The cellular mobile communication system is now operational as a digital automobile telephone system. In the digital mobile telephone system, as shown in FIG. 1A, a service area 1 is split into a plurality of radio zones 2a, 2b, 2c, ... , which are assigned control channels 3a, 3b, 3c, ... of individual frequencies, and the control channels 3a, 3b, 3c, ... are transmitted from radio base stations 4a, 4b, 4c, ... installed in the radio zones 2a, 2b, 2c, ... , respectively. When a mobile station 5 hands off during conversation, it measures the received levels of the control channels 3a, 3b, 3c, ... from the radio zones 2a, 2b, 2c, ... one after another through utilization of idle time slots I of the TDMA scheme which transmits and receives in specified time slots (Tx) and (Rx) as shown in FIG. 1B, then compares the measured received levels and selects the radio zone of the maximum received level as a destination or new radio zone.

On the other hand, in the spread spectrum mobile communication system, a single radio frequency is assigned in common to all radio zones involved and a plurality of spectrum spreading codes are assigned to each radio zone; one possible method for hand-off in this system is to scan the spectrum spreading codes by a correlator of the mobile station, select a destination radio zone by measuring and comparing the received levels every radio zone and set the spectrum spreading codes of the destination radio zone in the correlator. In the spread spectrum mobile communication system, however, it is necessary to prepare a wide-band radio frequency channel so that when traffic of the radio zones is unbalanced, many spectrum spreading codes could be used to accommodate or deal with the traffic imbalance; this inevitably leads to overdesign of low-traffic radio zones.

To avoid this, it is possible to employ a system configuration wherein a plurality of radio channels of different frequencies but of the same bandwidth corresponding to a certain traffic volume are prepared, radio zones of low traffic are assigned only one of the radio channels, radio zones of high traffic are assigned two or more of the radio channels and the radio channel of the same frequency is assigned a different spectrum spreading code at least every group of adjacent radio zones. In this instance, each communication channel is defined by a set (f, c) of the radio frequency f and the spectrum spreading code C. In the following description, the channel of the radio 20 frequency f that is assigned one or more spectrum spreading codes will be referred to as a radio channel. Hence, each radio channel is allowed to contain a plurality of communication channels defined by different spectrum spreading codes.

As indicated by the traffic volume distribution curve 6 in FIG. 2, traffic tends to be high in the central city area but decrease with distance therefrom. In such a situation, the number of radio channels necessary for dealing with traffic is selected large in the central area of the city but smaller with an increase in the distance therefrom as indicated by the channel numbers F1, F2, F3, assigned to the zones 2a, 2b, 2c, ... in FIG. 2. To hand off during conversation in this system configuration, the mobile station determines its destination radio zone on the basis of the received level of a predetermined communication channel (a control channel or broadcasting channel for zone selection use, for example) from every radio zone of the radio channel F1 of the frequency f common to all radio zones. Accordingly, to select the destination zone during conversation over a radio channel other than the common radio channel F1 in the radio zone assigned the plurality of radio channels F1, F2, ..., it is necessary to measure the received level in the common channel F1 and this requires interruption of the conversation. To enable measurement of the received level without interrupting the conversation, two receiving systems need to be prepared—this goes against the demand for miniaturization of the mobile station.

A possible solution to the above-noted problem is to employ a TDMA-like radio channel scheme as in the digital automobile telephone system and utilize a TDMA-type idle time slot to detect the destination zone. With this method, however, since signals become burst-like, the electromagnetic compatibility (EMC) of the system must be taken into account, besides guard bits and synchronization words are needed, impairing the efficiency in usage of the channel.

SUMMARY OF THE INVENTION

It is therefore an object of the present invention to provide a hand-off method and a mobile station for the spread spectrum mobile communication system which permit hand-off during conversation with no possibility of overdesigning low-traffic radio zones, with no need of preparing two receiving systems and with no fear of incurring the "electromagnetic compatibility" problem.

According to a first aspect of the present invention, a radio frequency is set in common to all radio zones belonging to a service area, the common radio frequency is assigned a spectrum spreading code for control use every radio zone and two correlators are provided in the mobile station. At the hand-off during conversation, one of the correlators is used to scan the spectrum spreading codes and measure the received levels for selecting the destination radio zone, while at the same time the other correlator is used to continue conversation.

According to a second aspect of the present invention, radio channels of a number corresponding to the traffic of each radio zone are assigned to the zone in a predetermined order, and radio channels equal in number to the difference between the largest one of the numbers of radio channels assigned to each zone and adjacent zones and the number of radio channels assigned to each radio zone are provided as hand-off-only channels in each radio zone. Furthermore, those of the assigned radio channels and hand-off-only channels of each radio zone which have the same frequency are assigned spectrum spreading codes which differ with radio zones. The mobile station is equipped with two corrrelators, one of which is used to scan the spectrum spreading codes and measure the received levels for selecting the destination radio zone and the other of which is used to continue conversation. When the channel held in communication after the hand-off operation is a hand-off-only channel, it is switched to one of the assigned radio channels in the same radio zone.

Thus, according to the first and second aspects of the present invention, the band of each radio channel is determined in accordance with the lowest traffic volume in the radio zones belonging to the service area and each radio zone is assigned radio channels corresponding in number to the traffic of the zone-this permits an economical and hence efficient channel configuration. Furthermore, since the mobile station has two correlators, it is possible to determine an optimum zone by the use of one of them while at the same time continuing conversation by the other correlator. In addition, hand-off during conversation can be done without switching the radio frequency and the nearest radio zone can be determined by just switching the spectrum spreading code; hence, there is no need of preparing two transmit-receive systems.

BRIEF DESCRIPTION OF THE DRAWINGS

FIG. 4 is a table showing an example of the configuration of the respective radio channel in FIG. 3;

FIG. 9 is a flowchart for the hand-off operation according to the second aspect of the present invention.

DESCRIPTION OF THE PREFERRED EMBODIMENT

Figure 3:
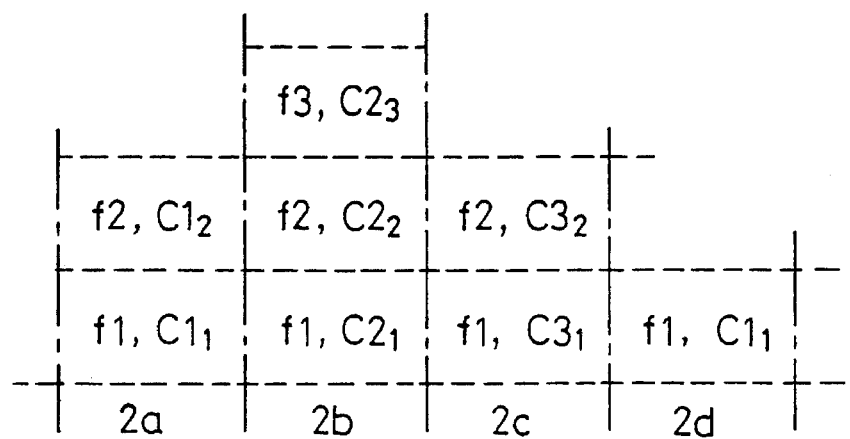
FIG. 3 is a diagram showing, by way of example, the assignment of radio frequencies and spectrum spreading codes to radio zones according to the first aspect of the present invention.

In FIG. 3 there is shown an example of the assignment of radio channels and spectrum spreading codes to four radio zones $2a$ through $2d$ according to the first aspect of the present invention. The radio zones $2a$ through $2d$ are each assigned radio frequencies (i.e. radio channels) of the number corresponding to the traffic volume of each zone as shown in FIG. 3. The band of each radio frequency needs only to accommodate communication channels (corresponding to the spectrum spreading codes) of about the same number as those required in the radio zone of the lowest traffic. In the example of FIG. 3, the radio zone $2b$ of the highest traffic is assigned three frequencies $f1$, $f2$ and $f3$, the radio zones $2a$ and $2c$ of the second highest traffic are each assigned two frequencies $f1$ and $f2$, and the radio zone $2d$ of the lowest traffic is assigned one frequency $f1$. The adjacent zones assigned the same frequency are each assigned a different spectrum spreading code to avoid interference between them.

Figure 1A:
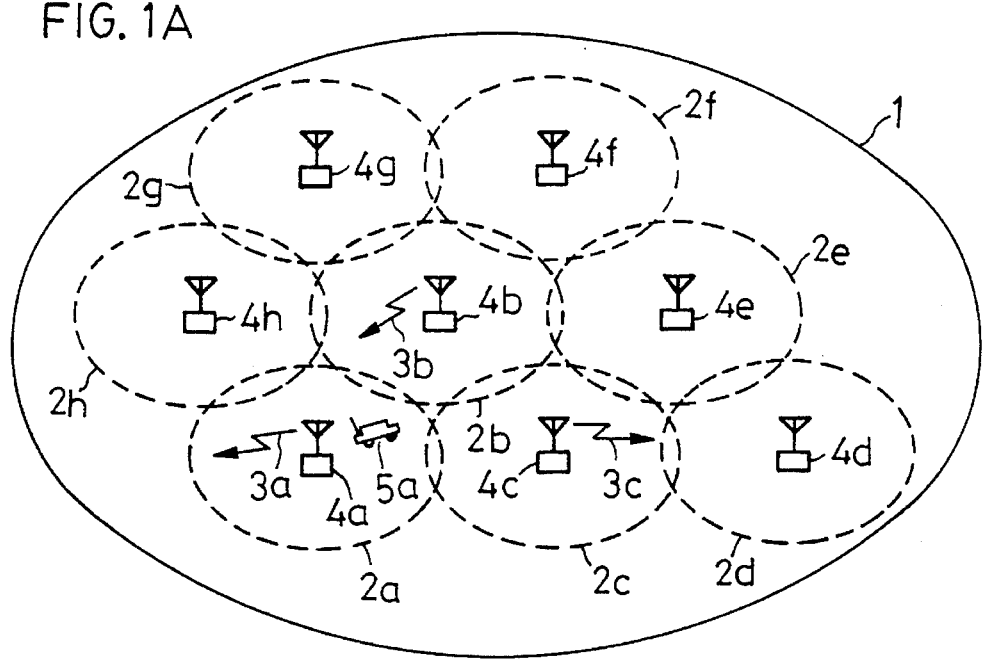
FIG. 1A is a diagram showing an example of the zone structure of the cellular mobile communication system.
Figure 1B:
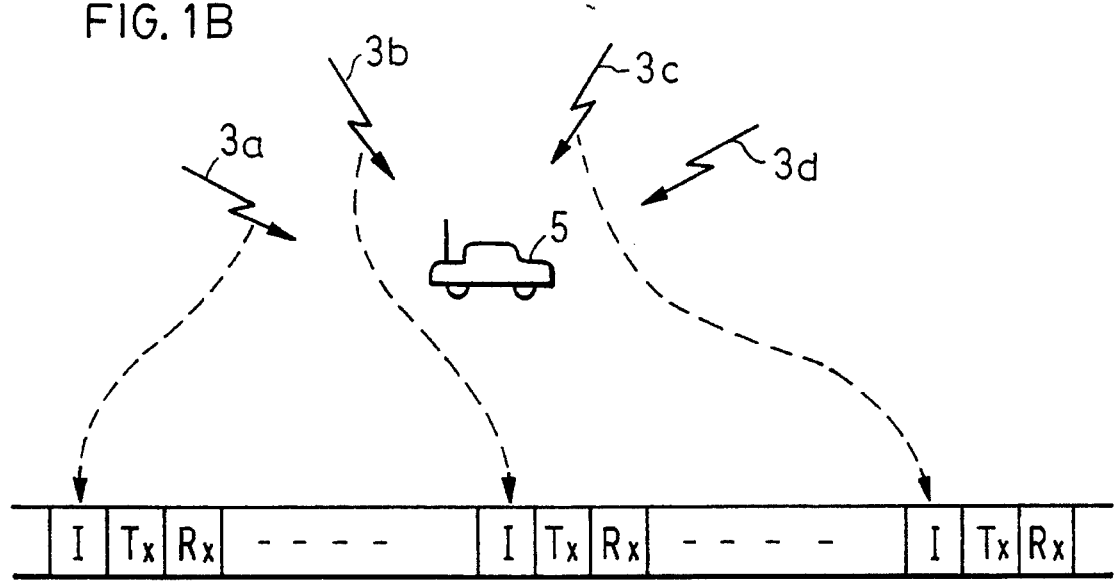
FIG. 1B is a diagram schematically showing measurements of received levels through utilization of idle time slots according to the TDMA system.
Figure 2:
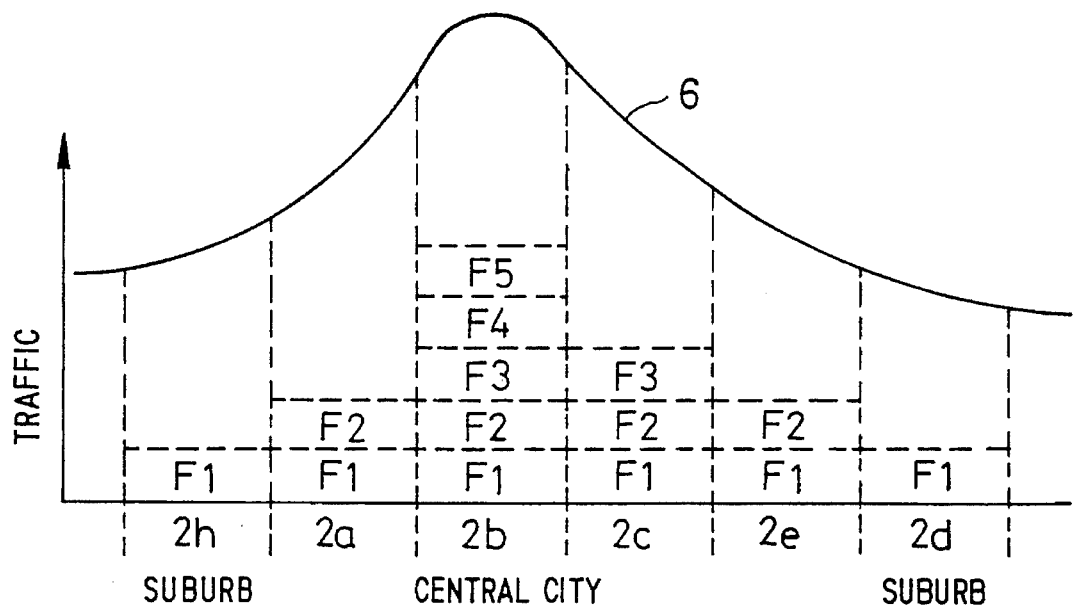
FIG. 2 is a diagram schematically showing the regional traffic distribution and the corresponding radio channel assignment.

Thus, according to the present invention, at least one common radio frequency is assigned to all the radio zones of the service area 1 (see FIG. 1A). In the example of FIG. 3, the radio frequency $f1$ is assigned to the radio zones $2a$ through $2d$ in common thereto. The common radio frequency $f1$ is specified for the respective adjacent zones $2a$ through $2d$ by spectrum spreading code groups $C1_1$, $C2_1$ and $C3_1$ which differ from one another. Each code group, for example, $C1_1$, includes a plurality of spectrum spreading codes $C1_{11}$, $C1_{12}$, ..., $C1_{1m}$ which define a plurality of communication channels and a spectrum spreading code $C1_{1c}$ which defines a control channel. In practice, each communication channel is assigned two spectrum spreading codes which define a pair of forward (from the mobile station to the base station) and reverse (from the base station to the mobile station) channels, but no distinction will hereinafter be made between the spreading codes for the reverse and forward channels in the interests of brevity.

The radio zones which are set at a distance long enough not to interfere with each other, such as the radio zones $2a$ and $2d$, may be assigned the same spectrum spreading code group, $C1_1$, in this example. Also for the frequency $f2$, the adjacent radio zones are assigned a plurality of spectrum spreading code groups $C1_2$, $C2_2$ and $C3_2$, respectively, which are used as communication channel codes alone and not used as control channel codes. It is also the same to the frequency $f3$. In FIG. 4, an example of the radio channel configuration of the above-said radio zones $2a$ through $2d$ is shown. For convenience, broadcasting channel codes, which are used in an embodiment according to the second aspect of the invention described later, are shown in FIG. 4. Incidentally, the number m of spectrum spreading codes for communication channels assigned to the radio channel of each frequency in the respective radio zones are not always the same.

As mentioned above, according to the present invention, at least one predetermined code in each of the spectrum spreading code groups $C1_1$, $C2_1$ and $C3_1$ assigned to the radio zones for the common radio frequency $f1$ is used as a control channel code, as indicated by $C1_{1c}$, $C2_{1c}$ and $C3_{1c}$ in FIG. 4, and remaining codes are used as communication channel codes.

Figure 5:
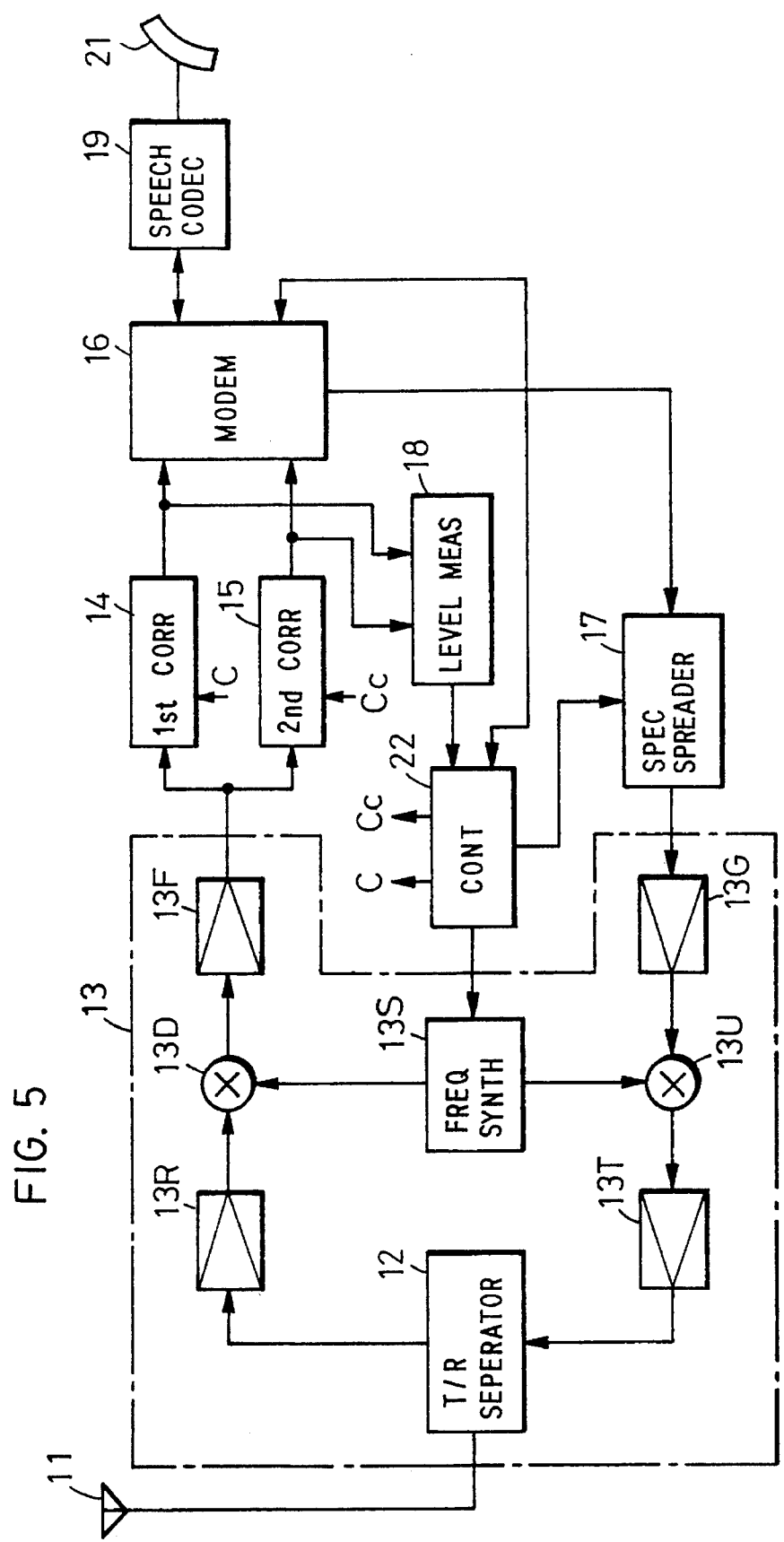
FIG. 5 is a block diagram illustrating an example of the mobile station which implements the hand-off method of the present invention.

In FIG. 5, there is illustrated an example of the mobile station embodying the hand-off method according to the first aspect of the present invention. A received radio frequency (RF) signal from an antenna 11 is fed via a T/R separator 12 to an RF signal transceiver part 13. An RF transmission signal from the RF transceiver part 13 is fed via the T/R separator 12 to the antenna 11. In the RF transceiver part 13, the RF received signal of a desired frequency set by a controller 22 is converted to an intermediate-frequency (IF) signal, which is fed to two correlators 14 and 15 in the present invention. The first and second correlators 14 and 15 each use a spectrum spreading code set by the controller 22 to despread the IF signal, thereby extracting the received signal which is in agreement with the spectrum spreading code. The received signal thus extracted is applied to a modem 16 and a level measuring part 18. The modem 16 is, for instance, a QPSK modem, which demodulates the signal from the correlator 14 or 15 into a received coded speech signal, which is provided to a speech coder/decoder (hereinafter referred to as a speech CODEC) 19. The speech CODEC 19 decodes the received coded speech signal and applies the output speech signal to a handset 21.

On the other hand, an input speech signal from the handset 21 is coded by the speech CODEC 19 and is then modulated by the modem 16. The modulated signal from the modem 16 is fed to a spectrum spreader 17, wherein it is spectrum spread using a spectrum spreading code set by the controller 22, the thus spectrum-spread signal being provided to the RF transceiver part 13. The RF transceiver part 13 outputs the spectrum-spread signal after converting it to a RF signal of a desired frequency set by the controller 22. The receiving side of the RF transceiver part 13 is made up of an RF amplifier 13R for amplifying an RF signal, a frequency converter 13D for converting the output RF signal from the RF amplifier 13R to an IF signal, and an IF amplifier 13F for amplifying the IF signal. Similarly, the transmitting side of the RF transceiver part 13 is made up of an IF amplifier 13G for amplifying the spectrum-spread modulated signal from the spectrum spreader 17, a frequency converter 13U for converting the amplified output to an RF signal, and an RF amplifier 13T for amplifying the RF signal and for feeding it to the antenna 11 via the T/R separator 12. A frequency synthesizer 13S generates a local signal of the frequency set by the controller 22 and applies it to the frequency converters 13D and 13U.

The controller 22 performs a call setup process, a hand-off process, setting of spectrum spreading codes for the correlators 14 and 15, setting of frequencies in the frequency synthesizer 13S and comparison of received levels measured by the measuring part 18.

Next, a description will be given of the hand-off operation of the embodiment according to the present invention.

The base station of each radio zone is always transmitting the identifying information of the base station via the control channel, control channel information of radio zones adjacent that of the base station, and so forth. In the present invention, since the frequency f1 of the control channel is common to all radio zones, spectrum spreading codes for control channels of the adjacent zones or information representing them is transmitted as the control channel information via the forward control channel.

When its power supply is turned ON, the mobile station first sets the spectrum spreading codes $C1_{1c}, C2_{1c}, C3_{1c}, \ldots$ for control channels of all radio zones in the correlator 14 or 15 one after another using the common frequency f1 and then measures the received levels in the level measuring part 18 for the respective codes so as to determine in which radio zone this mobile station exists.

The controller 22 determines that one of the spectrum spreading codes which provided the highest one of the received levels measured by the level measuring part 18 and sets the spectrum spreading code, for example, $C1_{1c}$ in the correlator 14, for instance. Based on the control channel information received accordingly, it is possible to detect the radio zone to which the mobile station currently belongs. As in the conventional mobile communication system, the mobile station transmits its identification number to the base station via the control channel for location registration and enters the call-waiting state.

Figure 6:
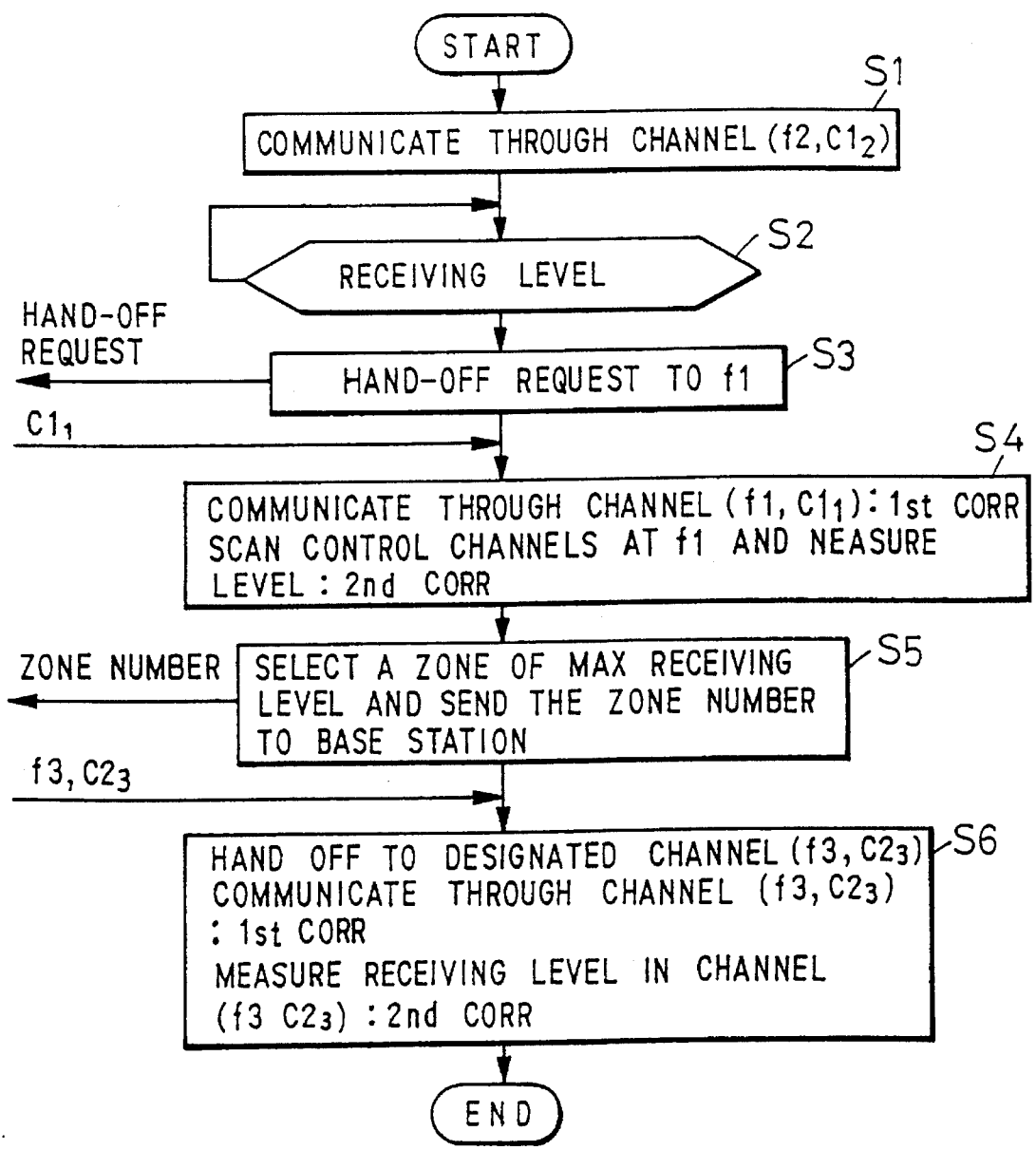
FIG. 6 is a flowchart for the hand-off operation according to the first aspect of the present invention.
Figure 7:
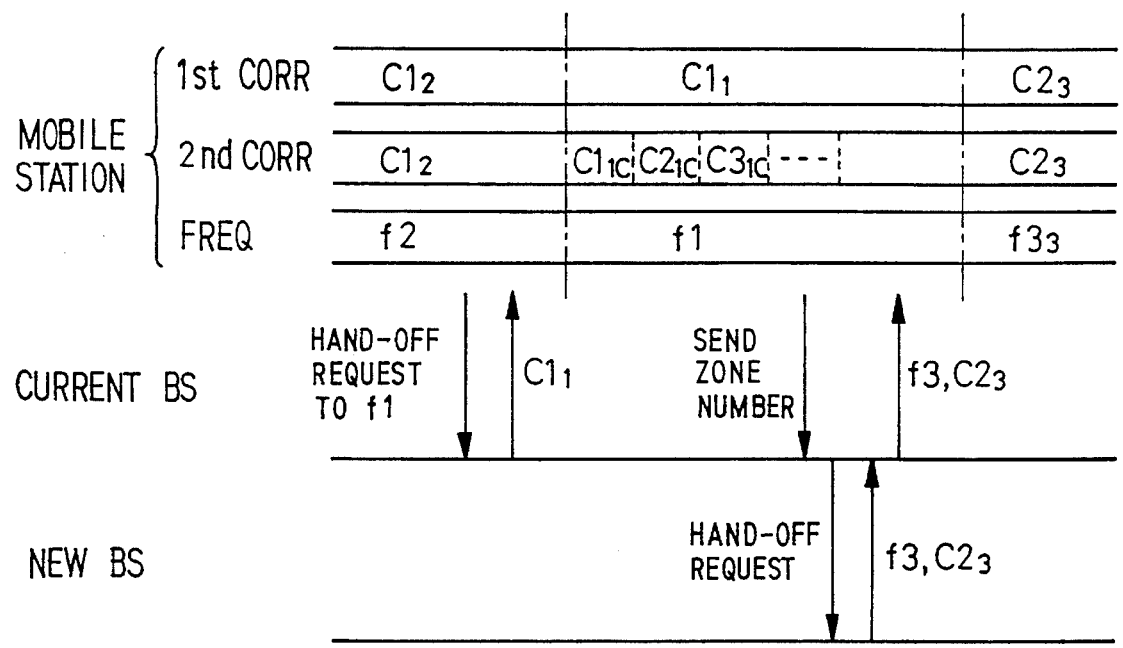
FIG. 7 is a timing chart explanatory of the operation following the FIG. 6 flowchart.

Next, a description will be given, with reference to FIGS. 6 and 7, of the hand-off operation according to the present invention. FIGS. 6 and 7 are a flowchart and a timing chart showing the operation of the mobile station transceiver of FIG. 5. Now, let it be assumed, for example, that as a result of receiving a mobile terminated call signal from the base station or transmitting thereto a call connect request signal via the control channel (f1, $C1_{1c}$) following the same procedure as in the prior art mobile communication system, the mobile station currently staying in the radio zone 2a shown in FIG. 3 is in the state of communication over the communication channel (f2, $C1_2$) specified by the base station after setting the frequency synthesizer 13S to the frequency corresponding to the frequency f2 (that is, letting the intermediate frequency be represented by $f_{1F}$, the transmission or oscillation frequency of the frequency synthesizer is set to f2-$f_{1F}$) and setting the correlators 14 and 15 and the spectrum spreader 19 to the spectrum spreading code $C1_2$.

During conversation using the correlator 14 with the spectrum spreading code $C1_2$ set therein in step S1, the received signal level of the same communication channel despread by the correlator 15 is always measured by the level measuring part 18 and monitored by the controller 22 to see if it is above a predetermined threshold value Vth (step S2). For instance, if the received level of the communication channel goes down below the threshold value Vth owing to degradation of the channel quality when the mobile station is going to move out of the current radio zone 2a and into the zone 2b adjacent it, the mobile station transmits a control signal requesting switching to the radio frequency f1 to the current base station at a band lower than the voice band (300 Hz to 3 KHz) in the communication channel (step S3). The base station transmits a control signal (commonly referred to as an in-service control signal) specifying the spectrum spreading code C1, to be used at the radio frequency f1 to the mobile station at the band lower than the voice band of the current communication channel (f2, $C1_2$). The controller 22 of the mobile station sets the code C1, in the correlator 14 and sets the frequency synthesizer 13S to the frequency f1, maintaining communication. At the same time, the controller 22 sets the spectrum spreading codes $C1_{1c}, C2_{1c}$ and $C3_{1c}$ for control channels of the adjacent radio zones in the correlator 15 one after another and measures the received levels of the control channels (step S4). The controller 22 chooses the spectrum spreading code of the control channel of the highest received level, then determines the corresponding zone as the nearest zone (i.e. the new zone), then reads out the identifying number of that zone from its internal table of zone vs. control channel spectrum spreading code and sends the zone identifying number as an in-service control signal of the communication channel to the current base station (step S5). Incidentally, it is also possible to send, as a substitute for the zone identifying number, the spectrum spreading code or information representing the maximum receive level, in which case the base station detects the corresponding radio zone.

Based on the zone information (i.e. the destination zone identifying number) from the mobile station, the current base station makes a request to the base station of the new radio zone (i.e. the new base station) for an idle communication channel to be used in the new radio zone; when the new base station responds to the request to specify the idle communication channel, for example, (f3, $C2_3$), the current base station indicates it to the mobile station. Upon receiving the specified idle communication channel information, the mobile station sets the spectrum spreading code $C2_3$ in the correlators 14 and 15 and the frequency synthesizer 13S to the frequency f3, thereby switching the current communication channel (f1, C1,) to the new channel (f3, C23) (step S6).

While in the above it is determined in step S2 if the received signal level is above the threshold value Vth, it is also possible to employ a method that scans the spectrum spreading codes $C1_{1c}, C2_{1c}, \ldots$ for control channels of the adjacent radio zones, then measures the received signal levels and determines if the zone of the maximum received level is the radio zone with which the mobile station is currently in communication; if not, the controller proceeds to step S3.

As described above, according to the present invention, the transceiver of the mobile station is provided with two correlators 14 and 15 and the common radio frequency f1 is assigned spectrum spreading codes for control channels of the respective radio zones and spectrum spreading codes for communication channels as well. Hence, when the mobile station hands off during conversation, the communication channel is once switched to that of the common radio frequency f1, by which it is possible to set the spectrum spreading codes for control channels of the respective radio zones in one of the correlators one after another and measure the received signal levels while at the same time maintaining communication at the radio frequency f1 through the other correlator. Thus, the communication channel can be switched without interruption of communication. Besides, there is no need of providing two sets of RF transmitting/receiving parts 13 for the communication channel and the control channel independently of each other.

Since the channel of the radio frequency f1 common to all radio zones is used for hand-off at frequent intervals, it is preferable that the common radio channel be usually kept idle or preserved for hand-off use and used as a control channel for a call setup process or the like except when only one radio frequency is available in the radio zone concerned or when no other frequency than f1 can be used even if a plurality of radio frequencies are assigned to the radio zone.

Figure 8:
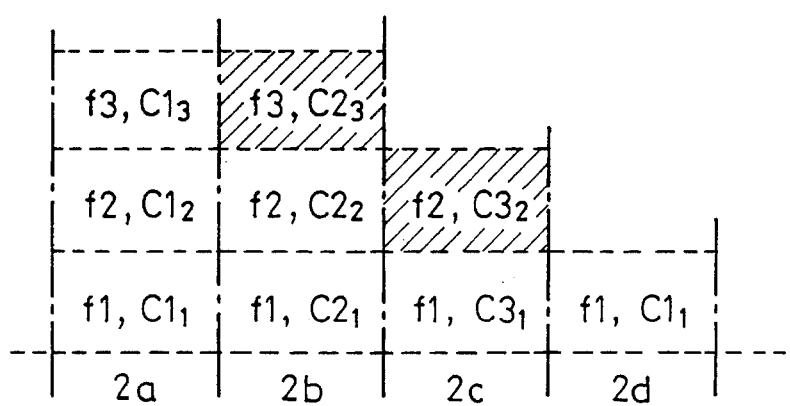
FIG. 8 is a diagram showing, by way of example, the assignment of radio channels, spectrum spreading codes and hand-off-only channels to radio zones according to the second aspect of the present invention.

FIG. 8 shows an example of the assignment of radio channels to each radio zone according to an embodiment based on the second aspect of the present invention. Also in this embodiment, a predetermined number of radio channels are allocated to the radio zones 2a, 2b, . . . in a predetermined order; that is, each radio zone is assigned radio channels of a number corresponding to its traffic volume. In the example of FIG. 8, the traffic of the radio zone 2a is the highest, the traffic of the radio zone 2b is lower than that of the radio zone 2a and the traffic of the radio zones 2a, 2d is even lower. Hence, the radio zone 2a is assigned three radio channels f1, f2 and f3, the radio zone 2b two radio channels f1 and f2, and the radio zones 2c and 2d each one radio channels f1. The radio channels are assigned in the order f1–f2–f3; namely, the radio channel f1 is first assigned to all the radio zones, then f2 to radio zones 2a and 2b, and f3 to the radio zone 2a.

Moreover, radio channels of a number corresponding to the difference between the largest one of the numbers of radio channels assigned to each zone and the adjacent ones and the number of radio channels assigned to each radio zone are provided as hand-off-only channels in each radio zone. That is, in the case of the radio zone 2a in FIG. 7, the number of radio channels assigned to the adjacent radio zone 2b is 2, whereas the number of radio channels assigned to the radio zone 2a is 3; since the difference between the largest number 3 and the number 3 of radio channels assigned to the zone 2a is zero, no hand-off-only channel is assigned to the radio zone 2a.

In the case of the radio zone 2b, the largest number is 3 among the number B of radio channels assigned to the one adjacent zone 2a, the number 1 of radio channels assigned to the other adjacent zone 2c and the number 2 of radio channels assigned to the zone 2b; in this instance, only one hand-off-only channel, which corresponds to the difference between the largest number 3 and the number 2 of the radio channels of the zone 2b, is provided in the zone 2b. In such a case, the radio channel f3, which is assigned to the radio zone 2a having the largest number of radio channels and is not assigned to the radio zone 2b, is allocated thereto as indicated by diagonal shading in FIG. 8.

Similarly, the radio zone 2c is assigned a hand-off-only channel f2 of the same frequency as that of the radio channel f2 of the adjoining radio zone 2b.

Furthermore, radio channels of the same frequency, including the radio channels assigned to the respective radio zones and the hand-off-only channels, are each allocated a group of spectrum spreading codes which differs with each radio zone. In FIG. 8, the radio channels f1, f2 and f3 of the radio zone 2a are assigned spectrum spreading code groups $C1_1$, $C1_2$ and $C1_3$, respectively; the radio channels f1, f2 and f3 of the radio zone 2b are assigned spectrum spreading code groups $C2_1$, $C2_2$ and $C2_3$, respectively; the radio channels f1 and f2 of the radio zone 2c are assigned spectrum spreading code groups $C3_1$, and $C3_2$, respectively; and the radio channel f1 of the radio zone 2d is assigned a spectrum spreading code group $C1_1$. As in the case of the above-described embodiment, each spectrum spreading code group, for instance, $C1_1$ includes a plurality of codes $C1_{1l}$ through $C1_{1m}$. Although the radio channel f1 and code group $C1_1$ of the radio zone 2a are the same as those of the radio zone 2d, this does not matter because the two radio zones are at a distance long enough not to interfere with each other. That is, in a region where interference is likely to occur, radio channels of the same frequency are allocated spectrum spreading codes which differ with radio zones.

In this embodiment, predetermined codes in the different spreading code groups $C1_1$, $C2_1$ and $C3_1$ allotted to the radio channel f1 common to the radio zones 2a through 2d are also used as spreading codes $C1_{1c}$, $C2_{2c}$ and $C3_{3c}$ for control channels of the radio zones, respectively. Unlike in the embodiment described previously, the code groups $C1_1$, $C1_2$ and $C1_3$ allocated to the radio channels f1, f2 and f3 of the radio zone 2a include spreading codes $C1_{1A}$, $C1_{2A}$ and $C1_{3A}$ predetermined for zone determination (see FIG. 4), and the base station always transmit over the radio channels f1, f2 and f3 assigned broadcasting channels defined by the zone determination spreading codes, respectively.

The mobile station for use in this embodiment is identical in construction with that shown in FIG. 5. The radio channel frequency f1 of the control channel is preset. When the mobile station transmits, the received signal levels of forward control channels from respective base stations are sequentially measured using both of the correlators 14 and 15 to detect the nearest radio zone and the spectrum spreading code for the control channel of the nearest radio zone is used to perform the call setup process. By using both correlators 14 and 15 to scan the spectrum spreading codes, the level measuring time can be reduced. One of the correlators 14 and 15 may be used to determine the nearest radio zone. When receiving a request for switching to the communication channel of the thus detected nearest radio zone from the mobile station through its current base station, the base station of the new radio zone determines the idle communication channel for use by the mobile station according to the rules given below.

(A) When there is an idle communication channel (i.e. a spectrum spreading code not in use) in the same radio channel as that f being currently used by the mobile station, this channel is selected preferentially. When no idle channel is found in this radio channel, an idle communication channel in other radio channel is selected.

(B) When the same radio channel as that f is a hand-off-only channel, it is selected and after completion of switching to the hand-off-only channel, an idle communication channel in other radio channel is selected and instructs the mobile station to switch to it in the zone.

FIG. 9 is a flowchart for hand-off according to the second aspect of the present invention. Now, let it be assumed that the mobile station is in communication over the communication channel (f2, $C1_2$) using the correlator 14 in zone 2a after mobile terminated or originated call processing (step S1). In this instance, the correlator sequentially sets zone determination spreading codes $C2_{2A}$ and $C2_{2A}$ of the current and adjacent zones in the same radio channels and measures the received signal levels (step S2) and determines if the zone of the maximum received signal level is the current radio zone (step S3). If so, the mobile station goes back to step S2. If not, the mobile station proceeds to step S4, wherein it indicates the radio zone of the maximum level (a new radio zone) to the current base station and requests hand-off.

In response to the hand-off request, the base station informs a new base station in the new zone of the current radio channel f2 of the mobile station and requests an idle communication channel. The new base station selects, for instance, an idle channel (f2, $C2_2$) according to the above-mentioned rules and indicates it to the current base station, which transmits to the mobile station an in-service control signal which instructs channel switching to the idle channel.

In step S5, the mobile station switches to the specified idle channel (f2, $C2_2$). That is, the mobile station sets the frequency synthesizer 13S to the frequency f2 and the spectrum spreading code $C2_2$ in the correlator 14.

As described previously, when the selected channel is the hand-off-only channel (f2, $C2_3$), the new base station selects, immediately after the start of communication with the mobile station, an idle channel, for instance, (f2, $C2_2$) of other radio channel and sends to the mobile station an in-service control signal instructing in-zone channel switching to the idle channel. The mobile station determines if the channel switching instruction is sent thereto in step S6, and if so, it performs channel setting in step S5.

As described above, according to the first and second aspects of the present invention, in the spread spectrum cellular mobile communication system, a radio frequency is assigned in common to all radio zones and the mobile station hands off by determining the destination radio zone using one of the two correlators while maintaining communication at the common radio frequency using the other correlator; hence, it is not necessary, for determining the destination zone, to provide two receivers in the mobile station and to use a TDMA-like radio channel configuration. Furthermore, the current or visited zone at the time of transmission can be determined in a short time by the concurrent use of the two correlators to scan the spectrum spreading codes. Besides, according to the first and second aspects of the present invention, the band of each radio channel is chosen in accordance with the traffic volume of the lowest-traffic radio zone in the service area and each radio zone is assigned radio channels of a number corresponding to the traffic volume of the zone—this permits the provision of an efficient channel configuration.

In the spread spectrum cellular mobile communication system according to the second aspect of the present invention, when the same radio channel as that assigned to the adjacent zone is not found, that radio channel is provided as a hand-off-only radio channel; hence, the mobile station does not need to switch to another radio channel for the determination of the destination channel. This avoids the necessity of providing two receivers in the mobile station and forming a TDMA-like radio channel configuration. Incidentally, since the hand-off-only radio channel is used temporarily for hand-off, the number of spectrum spreading codes to be assigned to it may be small. In addition, since the nearest radio zone for hand-off can be determined simply by switching the spectrum spreading code without switching the radio frequency, two systems of transceivers need not be prepared.

While the embodiments according to the first and second aspects of the present invention have been described as applied to hand-off when the mobile station moves into a new radio zone, it is evident that the present invention is also effective in switching to another communication channel in the same radio zone when the channel quality of the current channel is degraded by interference or the like.

It will be apparent that many modifications and variations may be effected without departing from the scope of the novel concepts of the present invention.

What is claimed is:

1. A hand-off method for a spread spectrum cellular mobile communication system wherein a service area is split into a plurality of radio zones, a base station is provided in each radio zone, and a mobile station hands off a communication channel over which said mobile station is currently communicating from a base station to which said communication channel belongs to another base station in the same service area or a base station in another service area according to the movement of the mobile station and continues the communication;

said method comprising the steps of:

assigning a common radio channel to all radio zones in a service area, said common radio channel having a frequency common to all radio zones in the service area, each of the radio zones being assigned a number of radio channels corresponding to the traffic volume of said radio zone, said number of radio channels having different frequencies from one another;

assigning to said common radio channel, for each radio zone, spectrum spreading codes for control to define control channels and at least one spectrum spreading code communication to define a communication channel, said spectrum spreading codes being different from one another at least between adjoining radio zones;

providing a mobile station with at least two correlators;

and, when the mobile station hands off a radio channel over which the mobile station is currently communicating by using one of said at least two correlators, causing the mobile station to perform the following steps:

switching the currently communicating radio channel to a communication channel of the radio channel common to all radio zones;

scanning, while continuing the communication using said one correlator, the spectrum spreading codes for control in each radio zone and measuring received signal levels thereof using the other correlator, and determining the radio zone having the highest received signal level among the measured received signal levels to be a destination radio zone;

informing the base station through which the mobile station is currently communicating of the determined destination radio zone to request a channel switching; and setting a communication channel specified by the base station through which the mobile station is currently communicating in response to the channel switching request and continuing the communication through a base station in the destination zone.

2. A hand-off method for a spread spectrum cellular mobile communication system wherein a service area is split into a plurality of radio zones, a base station is provided in each radio zone, and a mobile station hands off a communication channel over which said mobile station is currently communicating from a base station to which said communication channel belongs to another base station in the same service area or a base station in another service area according to the movement of the mobile station and continues the communication;

said method comprising the steps of:

assigning to each of the radio zones in a service area a number of radio channels corresponding to the traffic volume of each radio zone in a predetermined order, said number of radio channels having different frequencies from one another, so that radio channels first assigned to all of the radio zones constitute a radio channel having a frequency common to all of the radio zones;

assigning to radio zones adjacent to each radio zone a radio channel or channels as a hand-off-only radio channel or channels, said hand-oft-only radio channel or channels having been assigned to said each radio zone and having not been assigned to said adjacent radio zones;

assigning to radio channels having the same frequency a plurality of spectrum spreading codes, said spectrum spreading codes being different from one another for each radio zone;

providing a mobile station with at least two correlators; and, when the mobile station hands off a radio channel over which the mobile station is currently communicating by using one of said at least two correlators, causing the mobile station to perform the following steps:

scanning, while continuing the communication using said one correlator, the spectrum spreading codes in each radio zone and measuring received signal levels thereof using the other correlator, and determining the radio zone having the highest received signal level among the measured received signal levels to be a destination radio zone;

informing the base station through which the mobile station is currently communicating of the determined destination radio zone to request a channel switching;

setting a communication channel specified by the base station through which the mobile station is currently communicating in response to the channel switching request and continuing the communication through a base station in the destination radio zone; and switching the communication channel over which the mobile station is communicating after the hand-off, when it is the hand-off-only radio channel, to a non-hand-off-only radio channel in the same radio zone.

3. The method of claim 1, wherein said base station of said each radio zone is always transmitting via said control channel information corresponding to a spectrum spreading code for said control channel and spectrum spreading codes for control channels of adjacent radio zones and said step of said mobile station scanning said spectrum spreading codes includes a step wherein said spectrum spreading codes for control channels of said adjoining radio zones, received from said base station are sequentially set in said other correlator for measuring received signal levels.

4. The method of claim 2, wherein said radio channels of the same frequency are each assigned spectrum spreading codes for zone determination which differ from one another for the respective radio zones; said base station of said each radio zone is always transmitting a broadcasting channel using said spectrum spreading codes for zone determination; and said step of scanning said spectrum spreading codes for measuring said received signal levels is a step of scanning said spectrum spreading codes for said broadcasting channel to measure received signal levels.

5. The method of claim 2, wherein a base station of the radio zone of the maximum received signal level preferentially selects an idle communication channel of the same radio channel as that currently used by said mobile station and indicates thereto via the current base station said selected idle communication channel as the channel to be used.

6. The method of claim 1 or 2, wherein the band of said each radio channel is a band wide enough to permit processing the lowest traffic of said radio zones.

7. A mobile station for use in the hand-off method of claim 1 or claim 2, comprising:

an RF transmitting/receiving part which converts a radio channel of a desired frequency to an intermediate-frequency signal and converts a signal to be transmitted to a radio channel of a desired frequency for transmission;

said at least two correlators each being supplied with said intermediate-frequency signal from said RF transmitting/receiving part, and being operative to despread said intermediate-frequency signal by a spectrum spreading code set therein and output the result;

modem means which demodulates said despread output from one of said at least two correlators and modulates a signal to be transmitted;

a spectrum spreader which spectrum spreads said modulated signal to be transmitted and provides it to said RF transmitting/receiving part;

level measuring means for measuring the output level of at least the other correlator; and a controller which sets a desired spectrum spreading code in each of said at least two correlators and said spectrum spreader, sets the frequency of a radio channel to be selected in said RF transmitting/receiving part and determines the nearest radio zone on the basis of the output from said level measuring means.

8. The mobile station of claim 7, wherein the output of said one correlator is connected to said level measuring means so that it is allowed to measure the received signal level based on said spectrum spreading code set therein.

* * * * *